(12) United States Patent
Moran et al.

(10) Patent No.: US 9,049,291 B2
(45) Date of Patent: Jun. 2, 2015

(54) INTELLIGENT TAGGING FOR MULTIMEDIA CALL RECORDING PURPOSES USING CONTINUOUS METADATA

(75) Inventors: Thomas Moran, Galway (IE); David Murray, Galway (IE); John Costello, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 12/497,765

(22) Filed: Jul. 6, 2009

(65) Prior Publication Data

US 2011/0002451 A1    Jan. 6, 2011

(51) Int. Cl.
*H04M 3/00* (2006.01)
*H04M 3/42* (2006.01)
*H04M 3/51* (2006.01)

(52) U.S. Cl.
CPC ............ *H04M 3/42221* (2013.01); *H04M 3/51* (2013.01)

(58) Field of Classification Search
USPC ....................................... 379/88.22
See application file for complete search history.

(56) References Cited

U.S. PATENT DOCUMENTS

| | | | | |
|---|---|---|---|---|
| 6,411,687 | B1* | 6/2002 | Bohacek et al. | 379/88.21 |
| 7,043,008 | B1* | 5/2006 | Dewan | 379/265.06 |
| 8,254,887 | B2* | 8/2012 | Yamakawa et al. | 455/412.1 |
| 2003/0099343 | A1* | 5/2003 | Dezonno | 379/265.11 |
| 2008/0082341 | A1* | 4/2008 | Blair | 704/275 |

* cited by examiner

*Primary Examiner* — Amal Zenati
(74) *Attorney, Agent, or Firm* — Maldjian Law Group LLC; John Maldjian; Alexander D. Walter

(57) ABSTRACT

A method of indexing recordings of contact center communication sessions is described. The method allows for a recording to be indexed with metadata reflecting a time-varying characteristic of one or more of the parties of the communications session, e.g. the mood of a caller, the current location of a caller. The indexing of recordings with such information allows for more granular search of recordings, in order to find particular call conditions. This can be useful from the point of view of education and training of new call center operatives, and for assessment of call center performance.

14 Claims, 5 Drawing Sheets

INTELLIGENT TAGGING FOR MULTIMEDIA CALL RECORDING PURPOSES USING CONTINUOUS METADATA

FIELD OF THE INVENTION

This invention relates to the recording of communication sessions in a contact center environment, in particular to the intelligent tagging of recordings with time-varying metadata.

BACKGROUND ART

In a contact centers, it has become more common to store recordings of contact center communication sessions for later review and analysis, e.g. for performance evaluation or training purposes. In order to facilitate easier searching and classification of these recordings, many systems provide the ability to tag the recordings with appropriate metadata, which can then be subsequently used to search and analyze the call recordings. Typically this metadata consists of static pieces of data regarding the communication session, such as Automatic Number Identification (ANI), contact center agent skill set, Call ID etc., which do not vary during the call.

The phonetic search technology provided by Nexidia Inc. (www.nexidia.com) is operable to monitor audio for recognition of specific query criteria, and can associate specific predefined tags with the media stream using time indexing (e.g. tax X occurs at 3 minutes and 25 seconds into the stream). The Nexidia system is also operable to create an index of phonemes and where they occur in an audio stream, which can aid in the location of the discussion of topics in a media recording.

U.S. patent application Ser. No. 12/249,451 filed on Oct. 10, 2008, now U.S. Pat. No. 8,301,447, which issued on Oct. 30, 2012 (which is commonly assigned), describes a system which is operable to time index which party is speaking in a media stream involving two or more parties (such as indexing when an agent or a customer is speaking in a contact centre) or who is speaking throughout a multiparty conference call. This makes it possible to subsequently determine the flow of conversation during a media stream, and it can also be used to see if there is ever an occasion when one party may speak over another party (this would be important in a contact centre environment, if for example an agent speaks over a customer, this may be an indication of bad contact centre practice). However, there is a need for an improved system for analyzing a recording of a contact center communication session, which allows for better analysis of the session characteristics.

SUMMARY OF THE INVENTION

Accordingly, there is provided a method for providing an indexed recording of a telephony communication session involving a participant in said session, the method comprising the steps of, using a processing device:
- recording at least a portion of said telephony communication session;
- obtaining, in respect of one or more periods in which said participant is recorded as actively participating, at least one time-varying characteristic associated with said participant, wherein said at least one time-varying characteristic varies over time for that particular participant and is neither the identity of the participant nor the content of the participant's speech; and
- indexing said recorded data with metadata, said metadata varying in response to said at least one time-varying characteristic.

This allows for a system which is able to create a tagged recording of a communications session, wherein the metadata tagged to the recording provides a time-varying characterization of some element of the customer (or caller), or the contact center agent, or both.

The metadata is not simply a record of who is speaking, since the identity of a speaker is not a measured characteristic which varies over time for that speaker (rather it is a fixed characteristic of that speaker).

The metadata is also not the content of the participant's speech, since that is a characteristic of what is being said, rather than being a characteristic of the person saying it.

Preferably, the method further comprises the steps of:
- obtaining at least one time-varying characteristic associated with at least one other participant in said session, wherein said at least one time-varying characteristic varies over time for said at least one other participant and is neither the identity of the participant nor the content of the participant's speech; and
- indexing said recorded data with metadata, said metadata varying in response to said at least one time-varying characteristic associated with said at least one other participant.

Preferably, the method further comprises the step of storing the indexed recording in a storage device.

Preferably, in the step of indexing, the at least one characteristic is chosen from the following: a mood indicator; a location indicator; a speech volume indicator; a stress level indicator; a bandwidth usage indicator; an activity indicator.

Preferably, said mood indicator is based on the content of the participant's speech.

A bandwidth usage indicator may be used to index the quantity of bandwidth that is being used by the participant during the session. An activity indicator may be used to monitor how busy a participant is during a session. For example, a call center agent might be monitored to record the number of Instant Message (IM) sessions or other sessions that the agent is dealing with at any one time during a call.

Preferably, said metadata varies in response to said at least one time-varying characteristic by recording a time-varying value of the characteristic.

Alternatively or in addition, said metadata varies in response to said at least one time-varying characteristic by recording a rate of change of a time-varying value of the characteristic.

Indexing the rate of change of a characteristic allows for the recording to be analyzed with respect to when a particular mood swing occurred, the speed at which a member of the communication session is moving, etc.

Preferably, said step of indexing is performed as said communication session is being recorded as a contact center recording. This allows for real-time indexing of the contact center recording.

Further preferably, the method comprises the step of presenting an indication of the at least one time-varying characteristic to at least one of the participants during the communication session.

Alternatively, the method further comprises the initial step of providing a stored recording of a telephony communication session.

Preferably, the method comprises the step of receiving a characterization feed for the stored recording, the characterization feed comprising a time-varying indicator of the level of the at least one characteristic of the participant in the session.

In one embodiment, the characterization feed comprises a mood detection value from a speech analytics engine. In addition or alternatively, the characterization feed comprises a mood detection value from a facial gesture recognition analytics engine. In addition or alternatively, the characterization feed comprises location co-ordinates.

Preferably, said step of indexing is responsive to said characterization feed.

It will be understood that the contact center recording may comprise a telephony communications session recording. The contact center recording may further comprise a video feed, e.g. from a teleconference. The contact center recording may further comprise a recording of what is displayed on the terminal of the contact center agent.

There is further provided a system for indexing a recording of a telephony communication session involving a participant in said session, the system comprising:

a storage buffer for recording at least a portion of said telephony communication session;
 a characterization feed receiving device operable to receive at least one time-varying characteristic associated with said participant in respect of one or more periods in which said participant is recorded as actively participating, wherein said at least one time-varying characteristic varies over time for that particular participant and is neither the identity of the participant nor the content of the participant's speech; and
 a tagging processor operable to indexing said recorded data with metadata, said metadata varying in response to said at least one time-varying characteristic.

There is also provided a computer program product stored on a computer readable medium comprising a set of instructions which, when executed on a computer, are operable to implement the steps of the method as outlined above.

DETAILED DESCRIPTION OF PREFERRED EMBODIMENTS

Embodiments of the invention will now be described, by way of example only, with reference to the accompanying drawings, in which.

Figure 1:
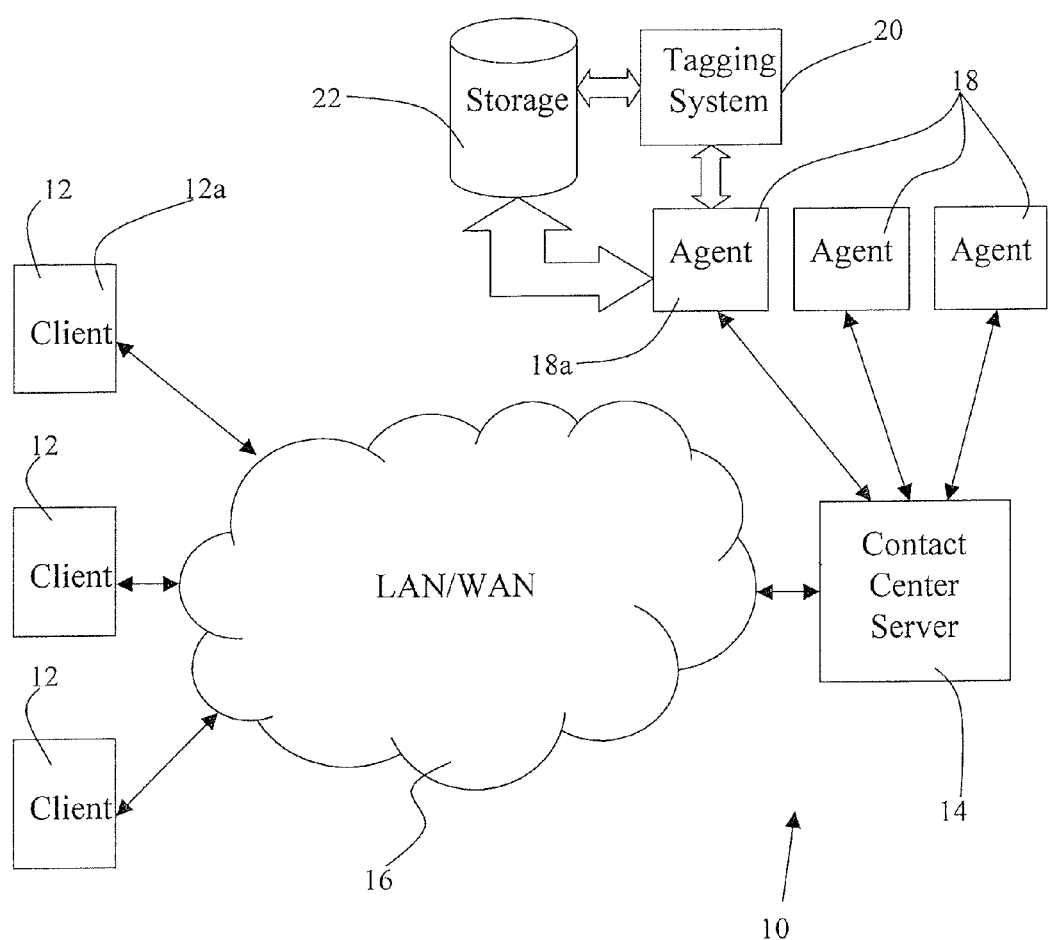
FIG. 1 shows a first contact center including an indexing system.

With reference to FIG. 1, a contact center configuration is indicated generally at 10. A plurality of clients 12 (also may be referred to as customers or callers) are communicatively coupled to a central contact center server 14 via communications network 16. The communications network 16 may be any local- or wide-area-network (LAN/WAN) suitable for facilitating telephony communications sessions (e.g. a public switched telephone network (PSTN), a Voice-over-IP (VoIP) system on the Internet, etc.). A plurality of contact center agents 18 are coupled with the central contact center server 14.

When a client 12a initiates a communications session with contact center server 14, the server 14 is operable to assign a particular contact center agent 18a to that particular client 12a. The contact center server 14 then establishes a communications session between the client 12a and the agent 18a.

The skilled person will be aware that the assignment of an agent may be dependent on interactions of the client 12a with automated processes of the contact center (such as an interactive voice response session and/or other treatments through which the contact is routed), and may take place after a time on hold. Typically the contact center server 14 will operate an automated workflow to characterize the contact to determine the skills required by an agent to handle the call efficiently, and to manage the allocation of contacts to agents according to grouped skill queues. Such standard features of a contact center are not described further here.

As the communications session takes place, whether before or after connection to an agent, a portion of the session itself is recorded and stored in storage system 22. The appropriate portion of the session is recorded for later analysis and review.

It will be understood that the portion of the session which is recorded may comprise a portion of the client's 12a interaction with for example an interactive voice response system, or a portion of the client's 12a interaction with an agent 18a, or may comprise substantially the entire communications session of the client 12a.

The system further comprises a call recorder, comprising a tagging system 20, coupled with the communications equipment used by the agent 18a. During the communication session, the characteristics of the session are analyzed, and a time-varying indication of the session characteristics are obtained. The recorded session is tagged with metadata reflecting the time-varying characteristic of at least one of the parties of the session. Such a characteristic may reflect for example the mood of one of the parties in the call, the location of one of the parties, etc. This metadata may be stored in storage system 22 with the session recording, or the metadata may be stored separately to the recordings, perhaps in a more localized storage system for more efficient searching.

It will be understood that the system is operable to receive an external characterization feed from an analytics engine, wherein the characterization feed comprises a measure of a time-varying characteristic of at least one participant in the communications session. It will be further understood that the system is operable to receive an external feed relating to the content of the speech of at least one participant in the communications session, and wherein the system is operable to analyze the external feed to derive a time-varying characteristic of the participant in question.

The characteristics analysis may be performed using any suitable classification system. For example, a speech analytics engine may be operable to determine the mood of one of the parties of the session, based on some combination of the participant's speech, e.g. a combination based on at least the volume level, stress level, language used, etc.

It will be understood that other characteristics analysis may be performed to determine a time-varying characteristic for a participant of the session. For example, the level of bandwidth usage of a participant in the session may be monitored. This may be useful for example in the context of a contact center for a customer support line, where an agent may be able to utilize remote access programs to analyze a customer's PC. If the bandwidth usage is monitored, this allows analysis to be performed on, for example, what the agent is doing, what applications they are using, the nature of the information processed, etc Furthermore, analysis may be performed to determine an activity indicator, which provides an indication of how busy a participant may be during a session. This may reflect the "multitasking level" of an agent in a call center. For example, the indicator may reflect the number of Instant Messaging (IM) sessions or other sessions that an agent is dealing with at any one time during a call, which can vary throughout a call.

Figure 2:
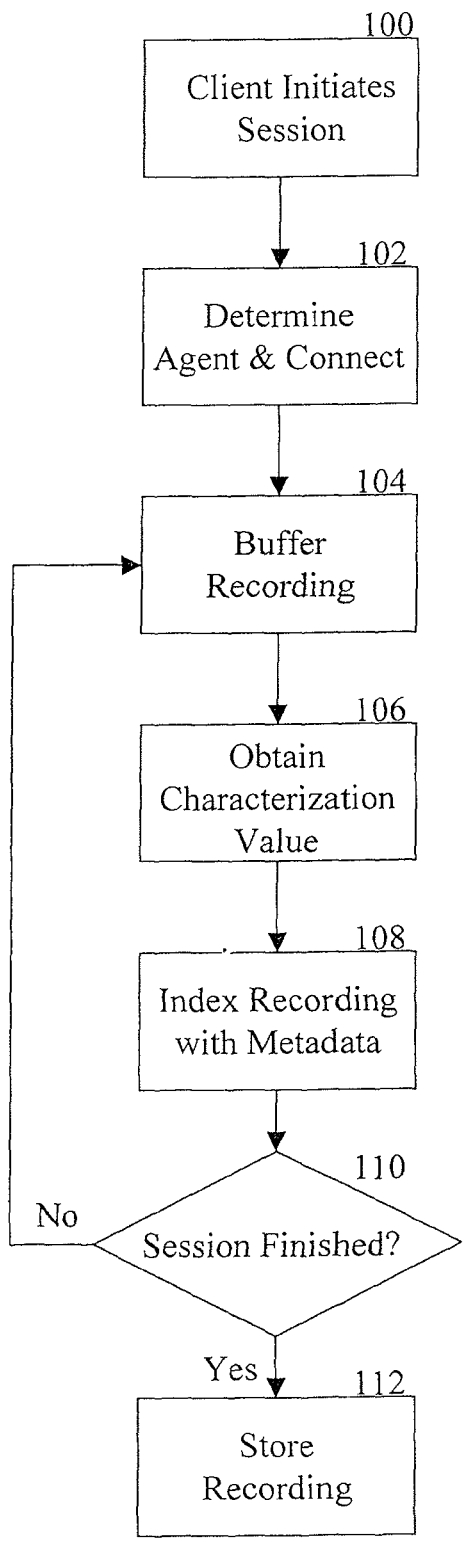
FIG. 2 is a flowchart for implementing a first indexing method.

This indicator may be extended to incorporate other factors, such as the rate/number of incoming emails & IM's etc. With reference to FIG. 2, an example flowchart is shown for how the system of the invention may be implemented in a contact center setting. In step 100, a client 12a initiates a telephony communication session with a contact center. This may be using any suitable procedure, for example, dialing a number of a contact center using a public switched telephone network (PSTN), a Voice-over-IP (VoIP) system on the Internet, etc. In step 102, the appropriate contact center server 14 is operable to determine the agent 18a best suited to deal with the client 12a in question. This may be as a result of for example the interaction of the client 12a with an interactive voice response (IVR) system, the navigation of a client 12a through a series of menu options presented by the server 14, or may simply be based on the number initially dialed by the client 12a. The contact center server 14 then establishes a telephony communication session between the client 12a and the agent 18a.

As the session is underway, a recording of the session is buffered by the system, step 104. For the recording, the system obtains a time-varying characterization value, step 106, which reflects a particular characteristic of a participant of the telephony session, in this case either the client 12a or the agent 18a (or both), and wherein the characterization value is neither the identity of the participant nor the content of the participant's speech (although such indications may be indexed in addition to the characterization value). The system is then operable to index (step 108) the buffered recording with metadata which reflects the characterization of the participant in question, such that the indexed recording illustrates the variance of the characterization of the participant for at least a portion of the session.

The indexing metadata relates to a time-varying characteristic of one participant at least. It is possible, and often desirable, to carry out indexing with metadata sets being indexed for the time-varying characteristics associated with each participant in a call (or a subset of a multi-participant conference call).

It will be understood that the indexing can be carried out as often as required, and may be adapted to satisfy for example requirements regarding the granularity of the indexed recordings, or subject to processing power and/or memory restrictions. For example, the indexing may be performed at predefined time intervals, e.g. every 5 seconds or every 50 milliseconds of the recording, or may be performed once the characterization value changes by a specified extent, e.g. when the volume at which one of the participants is speak rises or falls by a set number of decibels.

After the indexing step 108, the system is then operable to check whether the telephony communication session is finished or not, step 110. If the session is ongoing, the system returns to step 104 and continues to buffer and index the session recording. Once the session is completed, step 112, the indexed recording is stored in storage device 22 for future access, and the system awaits the initiation of a new contact center communication session.

It will be understood that, as the session is underway, portions of the buffered recording may be written to the storage device 22, for example to prevent buffer overflow. This does not affect the operation of the system described.

In this embodiment, the step of indexing the recording is performed once a communication session has been established between the client 12a and the agent 18a. However, as outlined above, it will be understood that the step of indexing may be performed for any portion of a telephony communication session involving a participant (e.g. the client 12a or the agent 18a), for example that portion of the session before the client 12a is in communication with the agent 18a (e.g. while the client 12a is dealing with an IVR system provided by the contact center server 14 as mentioned above).

Figure 3:
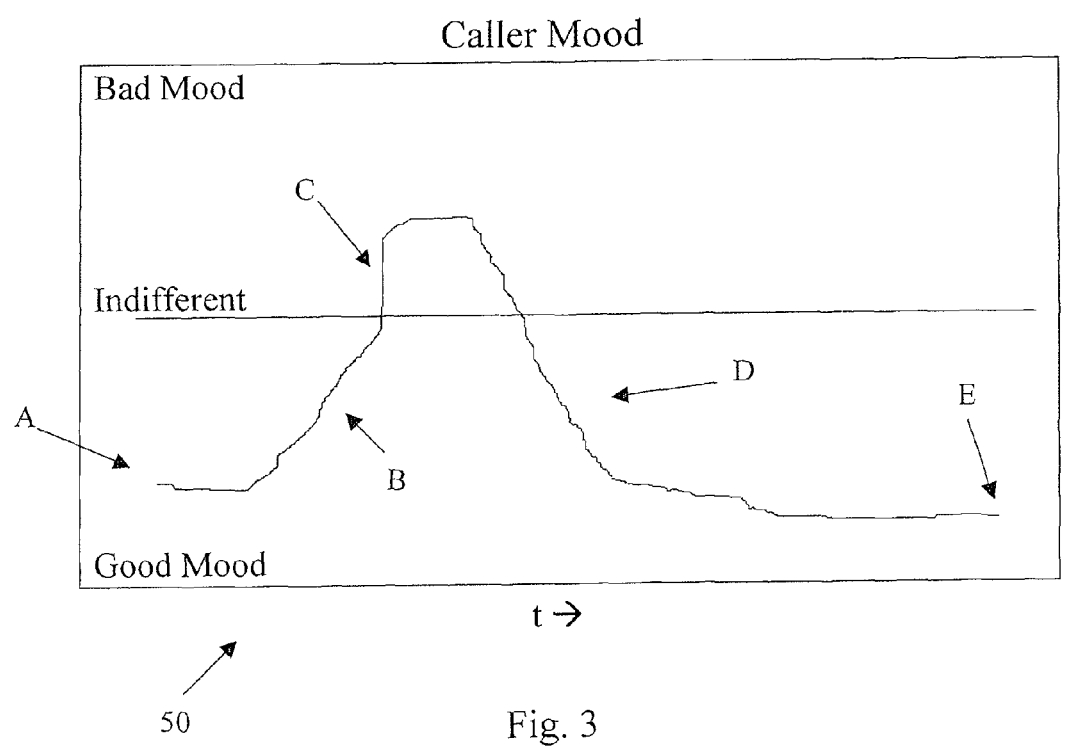
FIG. 3 is an example of a sample characterization feed for a communications session.

With reference to FIG. 3, an example of what an entire characterization feed 50 for the mood of a caller might look like is presented. The characterization feed illustrates the variation in mood of the caller between what is classified a "Good Mood" (i.e. where the caller appears to be satisfied with the communications session, the measured characteristic being below threshold) and a "Bad Mood" (i.e. where the caller is showing signs of dissatisfaction and/or irritation with the communications session, the measured characteristic being below threshold), with a mood of "Indifferent" used when the particular analytics engine used cannot discern the correct mood of the caller. The characterization feed is shown for the duration of a single session.

As can be seen from FIG. 3, the communications session starts with the caller in a relatively "good" mood (A). However, as the session continues, the mood of the caller decreases (B), until the caller is classified as suddenly entering a "bad" mood (C). This may be as a result of, for example, inappropriate handling of the session by the agent. The mood characteristic feed then shows the gradual improvement in mood of the caller (D), until the caller returns to a relatively "good" mood, and the session is completed (E).

The duration of the recorded session is tagged with the appropriate metadata from the characterization feed 50. This allows the recorded sessions to be indexed and searched on the basis of the time-varying characterizations of the callers, e.g. a search for every recorded session where the session ends with the caller in a "bad" mood.

The recorded session may also be tagged with additional metadata reflecting, for example, the rate of change of a characteristic of callers. This would allow further enhanced searches of the recorded sessions, e.g. a search for every recorded session where the caller went from a "good" mood to a "bad" mood relatively quickly (indicative of a mishandling of the call by the agent), or where the caller went from a "bad" mood to a "good" mood relatively quickly (indicative of good handling of the call by an agent to defuse the mood of the caller). This functionality would allow for improved training and education, as it would be easier to identify appropriate case studies of good and bad agent performance from the recorded sessions, e.g. it would help in identifying identify agents who are generally better at calming down an irate customer who is initially frustrated when the agent answers the call.

It will be understood that further types of characteristics analysis may be implemented dependent on the information available to the tagging system 20. For example, if the communications session comprises a video feed, tagging system 20 may be operable to perform facial expression analysis to determine the mood of a party to the session.

It will be understood that, if the characterization analysis is occurring in real-time, then such analysis may lead to improved operation of the overall call center. For example, when the system detects that a caller is entering a "bad" mood (C), a notification may be sent to the supervisor's agent. At this point, the supervisor may be invited to listen in on the communications session, or may receive an option to join the session to try to improve the mood of the caller.

In a further embodiment, the Enhanced 9-1-1 emergency system (E911) requires that a cell phone be able to transmit location information during an emergency call. In such a case, it would be possible to tag a contact center recording with metadata indicative of a session member's current location. In an emergency call, this could be the location of the caller (i.e. the person requesting emergency assistance), or the location of the 'agent' for the emergency call (e.g. a doctor or a paramedic en route to the caller). This location information may be presented in real time to a session member, as well as being recorded for further analysis and evaluation.

Figure 4:
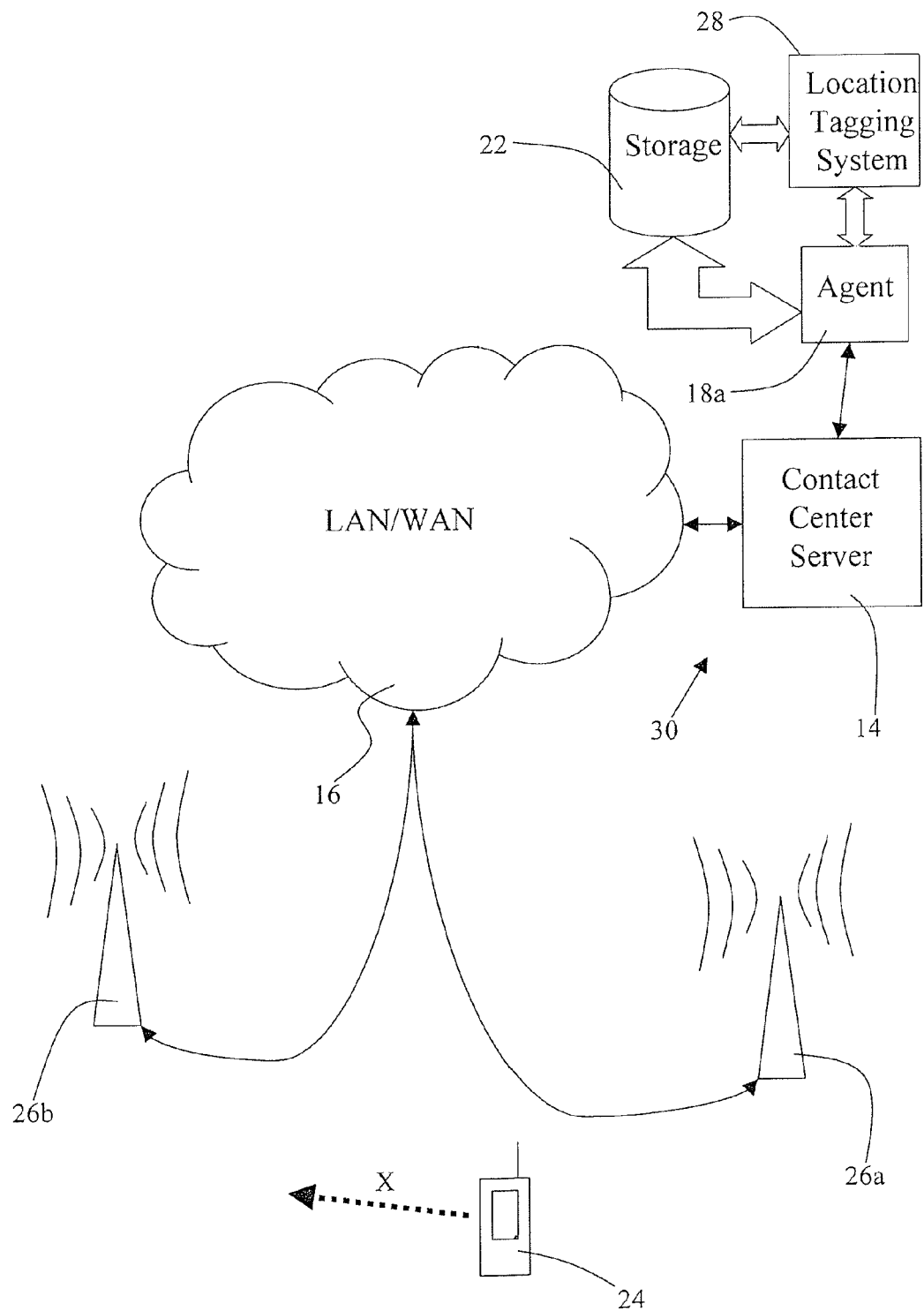
FIG. 4 shows a second contact center including an indexing system.

With reference to FIG. 4, an example of a contact center system utilizing location information is indicated generally at 30. As with previously-described system 10, the system 30 of FIG. 4 comprises a central contact center server 14 communicatively coupled to communications network 16. For ease of understanding only a single agent 18a is shown coupled with the central contact center server 14. As in the previous case, the agent 18a is coupled with storage device 22.

In the system of FIG. 4, the client 24 comprises a user of a mobile communication device, e.g. a cell phone, with the client 24 communicatively coupled to the communications network 16, and by extension to the central contact center server 14, via mobile communications towers or masts, 26a, 26b.

It will be understood that any suitable procedure may be followed for the establishment of a telephony communications session between the client 24 and the contact center agent 18a, for example as described in relation to the system of FIG. 1. Once a communications session has been established (either in the automated processes of the contact center or with the agent), and is in the process of being recorded for storage in storage device 22, the system 30 is operable to receive a location-related feed based on the current location of the client 24. The system 30 comprises location system 28, which is operable to receive the location-related feed, and to index the recorded telephony session with metadata based on the time-varying location data.

In this example, at the start of the communications session, the client 24 initially starts in a location relatively close to communications tower 26a, and is connected to the communications network 16 via communication with tower 26a. As the client 24 moves in the general direction as indicated by arrow X, the client device 24 will gradually become closer to communications tower 26b, and further away from tower 26a. Eventually, a point will be reached where the signal received from the tower 26b is stronger than the signal received from tower 26a, and a hand-off operation will be performed, resulting in the client 24 being in communication with the tower 26b, and by extension the communications network 16 and contact center system 30.

During this time, location system 28 receives an external feed based on the communications towers 26a,26b that the client 24 is in communication with. As a result, the location system 28 is operable to derive the general location of the client 24, based on the particular tower 26a,26b that the client 24 is coupled with. The location system 28 is accordingly operable to index the recording of the communications session with metadata based on the location characterization of the client 24, which can then be stored in storage device 22, as described above.

The location system 28 may comprise any suitable location-tracking hardware or software. It will be understood that any suitable location-based information may be used to provide metadata suitable for indexing, for example Cell-Of-Origin (COO) information, a triangulation operation based on the signal strength of a client device between a plurality of communications towers or base stations, the output of a GPS receiver provided in the mobile device of the client 24, etc.

Figure 5:
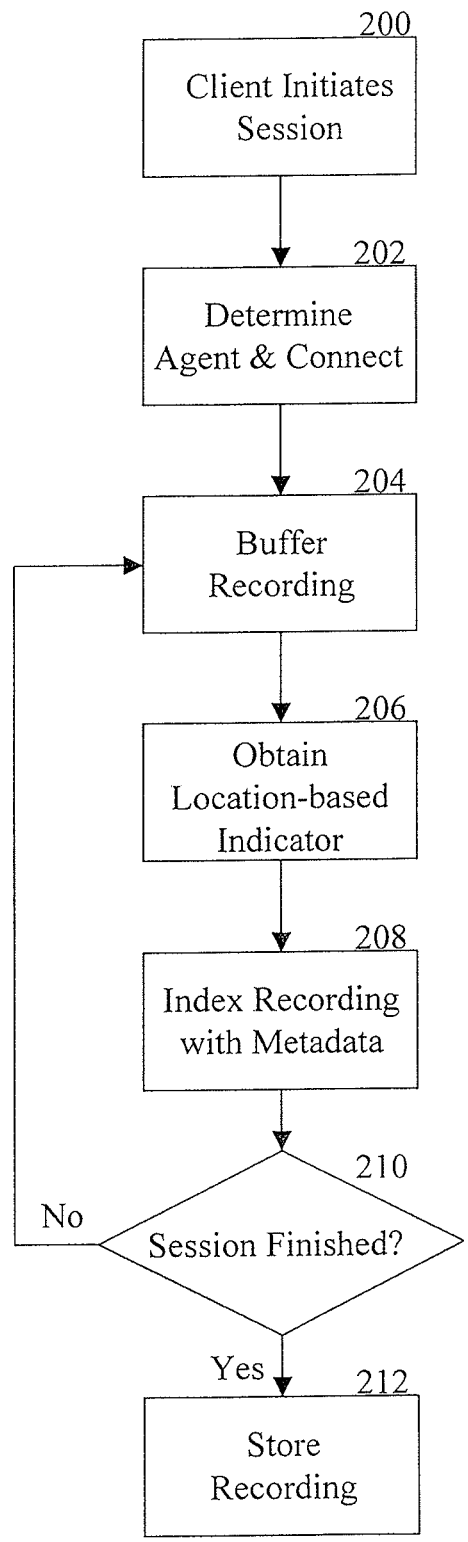
FIG. 5 is a flowchart for implementing a second indexing system.

FIG. 5 shows a sample flowchart for the system of FIG. 4, which is largely similar to the flowchart shown in FIG. 2. In step 200, client 24 initiates a telephony communication session with a contact center 30, via communications tower 26a coupled to communications network 16. In step 202, the appropriate contact center server 14 is operable to determine the agent 18a best suited to deal with the client 24 in question. The contact center server 14 then establishes a telephony communication session between the client 24 and the agent 18a.

As the session is underway, a recording of the session is buffered by the system 30, step 204. During the recording, the system 30 receives a time-varying location indicator, which is based on the current location of the client 24 (which is a characteristic of the client 24). In this example, the location indicator may be an identifier of the communication tower 26a with which the client 24 is currently in communication with (and which is related to the current location of the client 24).

The location tagging system 28 is operable to generate a metadata tag based on the received location indicator and, step 208, is operable to index the buffered recording with metadata which is based on the current location of the client 24.

As with the system of FIGS. 1 & 2, it will be understood that the indexing can be carried out as often as required, and may be adapted to satisfy for example requirements regarding the granularity of the indexed recordings, or subject to processing power and/or memory restrictions. For example, the indexing may be performed when the characterization feed indicates that the client 24 has changed location, or the indexing may occur at pre-defined time intervals.

The system 30 is then operable to check whether the telephony communication session has concluded or not, step 210. If the session is ongoing, the system 30 returns to step 204 and continues to buffer and index the session recording with location-based information. Once the session is completed, step 212, the indexed recording is stored in storage device 22 for future access, and the system awaits the initiation of a new contact center communication session.

As before, it will be understood that, as the session is underway, portions of the buffered recording may be written to the storage device 22, for example to prevent buffer overflow. This does not affect the operation of the system described.

It will be understood that the location information may be in the form of any suitable indication of location, e.g. GPS co-ordinates, current cell tower location, etc.

While in this example, the intelligent tagging and indexing occurs in real-time, i.e. during the communication session itself, it will be understood that the analysis and indexing may occur after the completion of the communications session between the parties. This may provide certain computational advantages, as the entire session can be analyzed at once.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

The invention claimed is:

1. A method for providing an indexed recording of a telephony communication session involving a participant in said session, the method comprising the steps of, using a processing device:
   recording at least a portion of said telephony communication session;
   obtaining, in respect of one or more periods in which said participant is recorded as actively participating, at least one time-varying characteristic associated with said participant, wherein said at least one time-varying characteristic varies over time for that particular participant and is neither the identity of the participant nor the content of the participant's speech; and
   indexing said recorded data with metadata, said metadata varying in response to said at least one time-varying characteristic, wherein said at least one time-varying characteristic is neither the identity of the participant nor the content of the participant's speech, and wherein for the step of indexing, the at least one characteristic is chosen from the following: a location indicator; a bandwidth usage indicator; an activity indicator.

2. The method of claim 1, wherein the method further comprises the steps of:
   obtaining at least one time-varying characteristic associated with at least one other participant in said session, wherein said at least one time-varying characteristic varies over time for that at least one other participant and is neither the identity of the participant nor the content of the participant's speech; and
   indexing said recorded data with metadata, said metadata varying in response to said at least one time-varying characteristic associated with said at least one other participant.

3. The method of claim 1, wherein the method further comprises the step of storing the indexed recording in a storage device.

4. The method of claim 1, wherein said metadata varies in response to said at least one time-varying characteristic by recording a time-varying value of the characteristic.

5. The method of claim 1, wherein said metadata varies in response to said at least one time-varying characteristic by recording a rate of change of a time-varying value of the characteristic.

6. The method of claim 1, wherein said step of indexing is performed as said communication session is being recorded.

7. The method of claim 1, wherein the method comprises the step of presenting an indication of the at least one time-varying characteristic to at least one participant during the communication session.

8. The method of claim 1, wherein the method comprises the step of receiving a characterization feed for the portion of the telephony communication session, the characterization feed comprising a time-varying indicator of the level of the at least one characteristic of the participant in the session.

9. The method of claim 8, wherein said step of indexing is responsive to said characterization feed.

10. A system for indexing a recording of a telephony communication session involving a participant in said session, the system comprising:
- a storage buffer for recording at least a portion of said telephony communication session;
- a characterization feed receiving device operable to receive at lease one time-varying characteristic associated with said participant in respect of one or more periods in which said participant is recorded as actively participating, wherein said at least one time-varying characteristic varies over time for that particular participant and is neither the identity of the participant nor the content of the participant's speech; and
- a tagging processor operable to indexing said recorded data with metadata, said metadata varying in response to said at least one time-varying characteristic, wherein said at least one time-varying characteristic is neither the identity of the participant nor the content of the participant's speech, and wherein for the step of indexing, the at least one characteristic is chosen from the following: a location indicator; a bandwidth usage indicator; an activity indicator.

11. A computer program product stored on a non-transitory computer readable medium comprising a set of instructions which, when executed on a computer, are operable to implement the steps of the method as outlined above.

12. The method of claim 1, wherein for the step of indexing, the at least one characteristic is chosen from a mood indicator and a speech volume indicator.

13. The method of claim 12, wherein said mood indicator is based on the content of the participant's speech.

14. The method of claim 8, wherein the characterization feed comprises at least one of a mood indicator, a volume indicator; and a stress level indicator.

* * * * *